S. H. LIBBY.
GUIDE ROLLERS FOR OVERHEAD CONVEYERS.
APPLICATION FILED OCT. 7, 1912.
1,119,762. Patented Dec. 1, 1914.
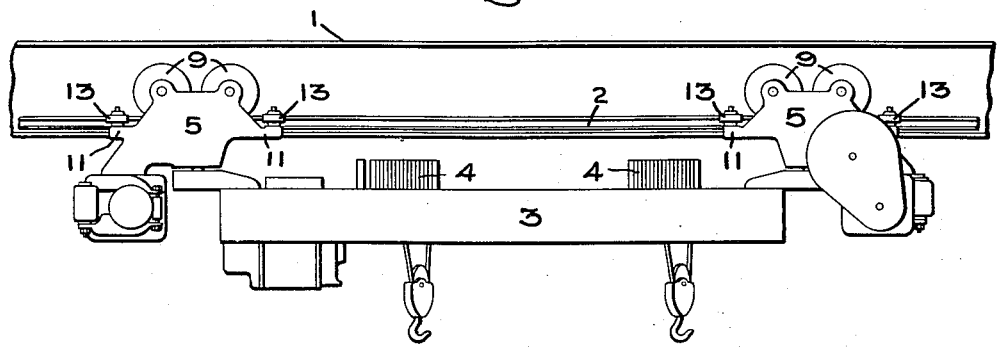
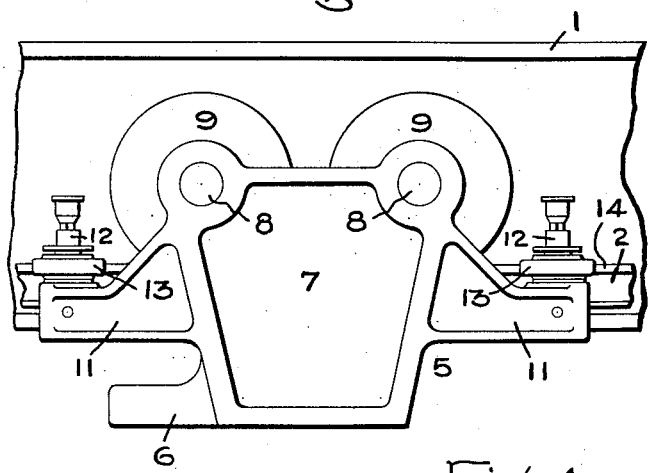
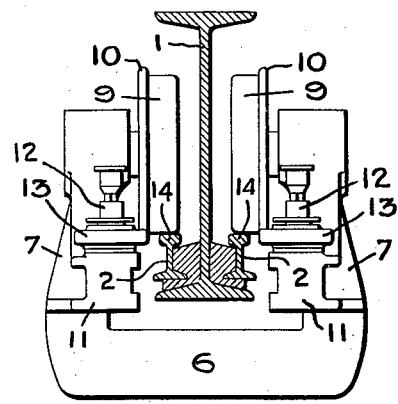
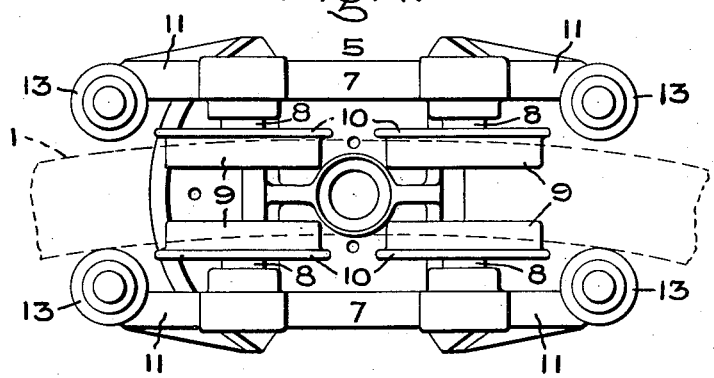
Witnesses:
Earl G. Klock
J. Ellis Glen
Inventor:
Sam H. Libby,
by Albert G. Davis
His Attorney

UNITED STATES PATENT OFFICE.

SAM H. LIBBY, OF EAST ORANGE, NEW JERSEY, ASSIGNOR TO GENERAL ELECTRIC COMPANY, A CORPORATION OF NEW YORK.

GUIDE-ROLLERS FOR OVERHEAD CONVEYERS.

1,119,762.     Specification of Letters Patent.     Patented Dec. 1, 1914.

Application filed October 7, 1912. Serial No. 724,335.

*To all whom it may concern:*

Be it known that I, SAM H. LIBBY, a citizen of the United States, residing at East Orange, county of Essex, State of New Jersey, have invented certain new and useful Improvements in Guide-Rollers for Overhead Conveyers, of which the following is a specification.

This invention relates to overhead conveyers of the type shown in my prior patent, granted April 2, 1912, No. 1,022,033, wherein a frame carrying electrically driven hoisting drums is suspended at each end from a truck adapted to run on an overhead track, or runway.

The truck has four wheels, two on each side, and each wheel mounted on its own axle. The wheels run on rails supported on opposite sides of an I beam and preferably by the lower flanges thereof, so that the beam lies between the two pairs of wheels on opposite sides of the truck. To keep them in proper position on the rails, the wheels have flanges on their outer edges. When such a truck rounds a curve in the track the wheel flanges are crowded against the rails, producing wear of the flanges and rails, and requiring greater power to drive the conveyer.

My invention aims to prevent all this by providing the truck with guide rolls rotatably mounted on vertical studs and so located as to come in contact with the inner rail when the truck strikes a curve. In this event, the guide rolls sustain the side thrust so as to prevent the truck from such lateral displacement as to bring its wheel flanges against the rails.

In the accompanying drawing, Figure 1 is a side elevation of a conveyer embodying my invention; Fig. 2 is a side elevation of one of the trucks on a larger scale; Fig. 3 is an end elevation of the same with the runway in section and Fig. 4 is a plan view of said truck.

The overhead track or runway consists of a beam 1 on whose lower flanges are supported the rails 2, one on each side. The conveyer has a housing 3 carrying the electrically driven hoisting drums 4 and suspended at each end from an electrically driven truck 5 running on the rails 2.

Each truck has a frame 6 passing under the beam 1 and having side plates 7, each carrying two short axles 8 on which are mounted supporting wheels 9 having outside flanges 10. The wheels on opposite sides of the truck stand opposite each other and are supported on the rails 2.

Extending fore and aft from the front and rear of the truck and preferably integral with the side plates, are brackets 11 on which are supported upright studs 12 carrying guide rollers 13 which rotate in the horizontal plane of the heads 14 of the rails 2. The brackets are long enough to bring the guide rolls considerably beyond the truck wheels, as shown in Figs. 2 and 4.

When the conveyer is running on a tangent, the rolls do not touch the rails, as appears from Fig. 3, but on a sharp curve the inside rolls by reason of their greater distance from the middle of the truck strike the inside rail, as shown in Fig. 4 and sustain the side thrust on the truck, effectually preventing the flanges of the wheels from grinding against the rails. This reduces wear and friction and lessens the power required to move the conveyer around the curve.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with an overhead conveyer truck having flanged wheels for running on suspended rails, of guide rolls rotating in the horizontal plane of said rails and adapted to come in contact with the inside rail on curves and prevent the flanges of the wheels on the inside of the curve from grinding against the inside rail.

2. The combination with suspended rails, of a conveyer truck having flanged wheels running thereon, and guide rolls at the front and rear of said truck rotatable in the horizontal plane of said rails but not touching them except on curves.

3. The combination with an overhead truck having flanged wheels for running on suspended rails, of guide rollers mounted in advance of said wheels and at the rear thereof to engage the rails on curves but normally out of engagement therewith.

4. An overhead conveyer for running on suspended rails comprising two trucks and a housing supported between the same, each of said trucks having flanged wheels, and guide rollers mounted in advance of said wheels and at the rear thereof to engage the rails on curves but normally out of engagement therewith.

In witness whereof, I have hereunto set my hand this 4th day of October 1912.

SAM H. LIBBY.

Witnesses:
ROGER H. BUTTERWORTH,
ANNA T. MCMANUS.